United States Patent [19]
Warfel

[11] 3,929,194
[45] Dec. 30, 1975

[54] HORSESHOEING METHOD AND NAIL

[76] Inventor: Mark Warfel, R.D. 2, Halifax, Pa. 17032

[22] Filed: Aug. 8, 1973

[21] Appl. No.: 387,825

[52] U.S. Cl. .................................................. 168/23
[51] Int. Cl.² .......................................... A01L 7/10
[58] Field of Search ........ 168/23, 17, 21, 45; 85/12, 85/13, 14, 49; 227/144

[56] References Cited
UNITED STATES PATENTS

| 255,765 | 4/1882 | Bryden | 168/21 |
|---|---|---|---|
| 1,145,247 | 7/1915 | Kocontes | 168/21 |
| 1,163,617 | 12/1915 | Dresser | 168/45 |
| 1,367,363 | 2/1921 | Ellis | 227/144 |
| 1,528,415 | 3/1925 | Fuller | 227/144 |
| 1,792,837 | 2/1931 | Harrison | 227/144 |

Primary Examiner—Russell R. Kinsey
Assistant Examiner—J. Q. Lever
Attorney, Agent, or Firm—Seidel, Gonda & Goldhammer

[57] ABSTRACT

A method of applying shoes to horses wherein nails having two prongs pass through the shoe and the shell of the hoof by application of squeezing pressure using a tool having pivotable jaws whereby hammering of the nail is avoided.

4 Claims, 6 Drawing Figures

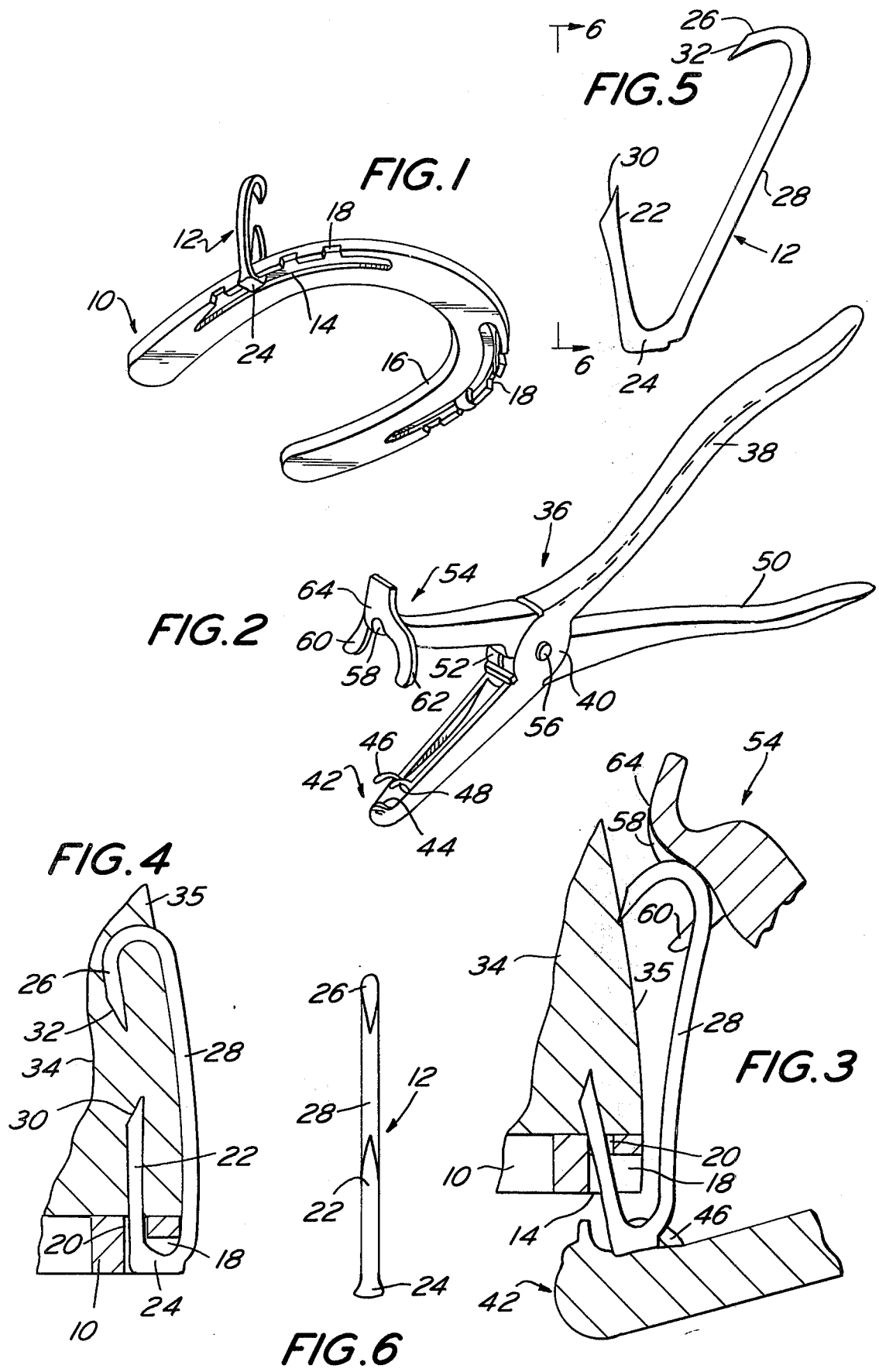

HORSESHOEING METHOD AND NAIL

The shoes of a horse are conventionally applied by pounding a nail through a hole in the shoe into the shell of the hoof. It takes a professional to hammer a nail properly so that it stays in the shell and its path does not deviate into the life or tender portion of the horse's hoof. In a conventional method of horseshoeing, the operator picks the foot up and holds it between his legs. It takes about 2 hours to nail and clinch on a set of shoes for a horse. There is always the danger of huring the animal or the operator in the event that the horse pulls his foot. Everytime a hammer is applied to a nail for securing a shoe to the horse, there is a natural instinct for the horse to move his foot. This requires the operator to realign the position of the shoe and the foot of the horse.

Nails which break through the shell must be clinched. This produces a weakening effect on the shell. If several nails break through the shell at approximately the same level, the shell becomes extremely weak and it is difficult to remove clinches through a weakened area of the shell. The above difficulties with a conventional shoeing method and others are solved by the present invention.

In accordance with the present invention, the basic concept is to avoid hammering the nail but instead use a tool which will press the nail. In order to have a nail which can be pressed in, it was necessary to redesign the shape of the nail and provide a tool which could be used for this purpose.

The shoe utilized when practicing the present invention is similar to a regular horseshoe except for the addition of notches along the outside of the shoe. The notches are correlated to be juxtaposed to the nail holes provided along a groove on the bottom surface of the shoe. The size of the notches is dictated by the size of the nail.

The nail utilized in accordance with the present invention is generally C-shaped. The nail has two prongs which are beveled so that they will turn away from the life portion of the horse's foot. The nail is preferably tempered only at the shank but may also be tempered at the base. When the nail has been applied, the prongs are pointing generally toward one another although one passes upwardly through the horseshoe while the other passes through the outer face of the shell and then downwardly.

The tool for pressing a nail into the hoof and thereby shoeing the horse is in the form generally considered to be pliers. The jaw portions of the tool are different in shape and are different in length. One of the tool jaws is grooved to hold one prong portion of the nail in the proper position and guide it from slipping out of position when pressure is applied so that it may enter the hoof. The other jaw of the tool is shaped to cooperate with the base of the nail and support the same so that a prong adjacent thereto may pass through a hole in the horseshoe and into the hoof. When using the tool, the prongs are pressed into the hoof to thereby clamp the shoe onto the hoof with the shank of the nail being tight against the outer peripheral surface of the shell.

The primary advantage of the present invention is the elimination of hammering, thereby minimizing foot movement. Another important advantage is the elimination of clinching the nail. These advantages cut down on the shoeing time by at least fifty percent. There is little or no risk of the blacksmith being hurt by the nail. The nails actually strengthen the shell instead of weakening the shell as is the case with a conventional shoeing method. There is little or no chance of the nail entering the life of the horse. If a shoe has to be removed, it is a simple process of snipping the shank of the nail along the outer peripheral surface on the shell of the hoof and pulling out both ends.

The invention permits faster shoeing because the nail does not have to be hammered and the protruding end does not have to be snipped off. No clinching is required. There is no waste of nails. First, there is no possibility for the nail to be improperly directed toward the life, as often happens with the standard nail, requiring it to be pulled and another nail used. Second, because of the hole sizes in the horseshoe, only the correct size nail would be used. Again, this is a source of waste with the standard method.

It is an object of the present invention to provide a novel horseshoeing method and nail.

It is another object of the present invention to provide a horseshoeing method wherein nails for securing a horseshoe to a hoof are pressed into the shell at two locations at substantially the same time.

It is another object of the present invention to provide a horseshoeing method and nail which avoids hammering and/or clinching.

Another object of the present invention is to provide a horseshoeing method which minimizes the skill needed for shoeing horses.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a bottom perspective view of a horseshoe with a nail applied thereto.

FIG. 2 is a perspective view of the nail application tool.

FIG. 3 is a sectional view showing a nail being applied to retain a horseshoe on the hoof of a horse.

FIG. 4 is a sectional view showing a horseshoe secured to a hoof by means of a nail in accordance with the present invention.

FIG. 5 is a side elevation view of a nail prior to application of the same by means of the tool in FIG. 2.

FIG. 6 is an end view taken along the line 6—6 in FIG. 5.

Referring to the drawing in detail, wherein like numerals indicate like elements, there is shown in FIG. 1 a horseshoe designated generally as 10 with a nail 12 illustrated in its applied position. The shoe 10 is provided with arcuate grooves 14 and 16. The grooves are provided with notches 18 on their outer periphery. Adjacent each notch, the grooves 14 and 16 are provided with holes 20. The notches 18 accommodate a portion of the nail 12 as shown in FIGS. 1 and 4.

The nail 12 includes a lower prong 22 extending upwardly from a base 24. The base 24 is wider than the remaining portions of the nail 12 as will be apparent from FIG. 1. An upper prong 26 is connected to the base 24 by means of a shank 28. The shank 28 as well as the prongs 22 and 26 are all aligned with one another. Prong 22 is provided with a bevel 30 so as to cause the same to be turned away from the life of the horse when entering the hoof. Prong 26 is provided with a similar bevel 32. The base 24 is the widest part of the nail and is generally flat on its lowermost surface.

The nail 12 is utilized to clamp the shoe 10 to the bottom of the hoof 34 by means of a tool designated generally as 36. See FIG. 2. Tool 36 includes a handle 38 extending in one direction from a hub 40. A jaw 42 extends in the opposite direction from the hub 40 and is movable by means of a handle 38. The jaw 42 includes a reaction surface 44 and forwardly extending curved guide members 46 and 48 which are spaced from one another and through which the shank 28 will extend.

The tool 36 includes a second handle 50 which extends in one direction from a hub 52. A jaw 54 extends from the hub 52 in the opposite direction and is manipulated by movement of the handle 50. The hubs 40 and 52 are pinned together and permitted to pivotably move relative to one another by means of the pin 56. The jaw 54 includes a groove 58 on its bottom face for accommodating the prong 26. Guide members 60 and 62 extend downwardly and forwardly so as to prevent the shank 28 from slipping sideways. Jaw 54 also includes a curved guide surface adapted to have a camming action against the prong 26.

When practicing the method of the present invention, the horse's foot is picked up and held in the conventional manner. The shoe 10 overlies the hoof. A nail 12 is extended through the hole 20 at the bottom of the groove 14. Thereafter, the tool 36 is held in a manner so that the base 24 is received by the jaw 42 and the prong 26 is held by the jaw 54. Thereafter, the operator merely squeezes on the handles 38 and 50 to cause prong 22 to enter into the hoof 34 and then curve away from the life of the horse while at the same time prong 26 enters through the side face 35 of the hoof or shell and then curves downwardly toward the prong 22. The bevels 32 and 30 cause the prongs 22 and 26 to curve away from the life of the hoof and towards each other until the nail 12 assumes the position shown in FIG. 4 with the base 24 received in the notch 18 and the shank 28 overlying the side face 35 of the hoof 34 in a tight manner. It will be noted that the bottom surface on the base 24 is generally parallel to the bottom face of the horseshoe 10. There is no hammering when applying the nail 12 to the shoe 10 and the hoof 34. The application of the nail 12 may be referred to as a pressing or clamping action so as to distinguish it from hammering.

Due to the manner in which the nail 12 is clamped to the shoe 10 in hoof 34, there is no danger to the blacksmith while at the same time the shoe can be applied at least 50 percent faster. The speed results in the fact that the horse receives a smooth steady action as opposed to a hammering action. It is the hammering on the hoof which causes the horse to pull away in the conventional shoeing method. Due to the fact that the shank 28 overlies and extends along the hoof, it actually strengthens the same. Removal of the nails 12 is attained merely by snipping the shank 28 and removing the separate prongs 22 and 26.

While the above refers to the animal as being a horse, the present invention is applicable for applying shoes to other hoofed animals such as donkeys, ponies, mules, etc.

The present invention may be embodied in other forms without departing from the spirit or essential attributes thereof and, accordingly, reference should be made to the appended claims, rather than to the foregoing specification as indicating the scope of the invention.

I claim:

1. A method of applying shoes to hoofed animals without entering the life of the animal comprising the step of placing a shoe so that it overlies the bottom surface of a hoof, and coupling the shoe to the hoof by nails having first and second prongs without hammering the nails, said coupling step including introducing one prong of a nail through a hole in the shoe while the other prong on the nail is pointed toward a side face of the hoof, and then simultaneously applying pressure to both prongs to enter into the hoof and secure the shoe to the hoof.

2. A method in accordance with claim 1 wherein said step of applying pressure simultaneously to the prongs includes supporting the nail between the jaws of a plier-like tool which applies the pressure to the nail to cause both prongs to simultaneously enter the hoof at different elevations on the hoof.

3. A method in accordance with claim 1 including causing the prongs to enter the hoof and then curve towards each other so that each prong is generally perpendicular to the shoe.

4. A method in accordance with claim 1 including bending a shank extending between one of the prongs at a base on the nail so that the shank conforms generally to the curvature of the outer peripheral surface of the hoof and extends upwardly along said surface.

* * * * *